(12) United States Patent
Fanning et al.

(10) Patent No.: US 10,096,965 B2
(45) Date of Patent: Oct. 9, 2018

(54) ALGORITHMS FOR RAPID GATING OF SEED SUSPENDABLE PULSED FIBER LASER AMPLIFIERS

(71) Applicant: nLIGHT Photonics Corporation, Vancouver, WA (US)

(72) Inventors: C. Geoffrey Fanning, Portland, OR (US); Timothy N. Kutscha, Portland, OR (US)

(73) Assignee: nLIGHT, Inc., Vancouver, WA (US)

( * ) Notice: Subject to any disclaimer, the term of this patent is extended or adjusted under 35 U.S.C. 154(b) by 343 days.

(21) Appl. No.: 14/657,791

(22) Filed: Mar. 13, 2015

(65) Prior Publication Data

US 2015/0263481 A1    Sep. 17, 2015

Related U.S. Application Data

(60) Provisional application No. 61/952,659, filed on Mar. 13, 2014.

(51) Int. Cl.
| | |
|---|---|
| B23K 26/00 | (2014.01) |
| H01S 3/13 | (2006.01) |
| H01S 3/00 | (2006.01) |
| H04B 10/25 | (2013.01) |
| H01S 3/094 | (2006.01) |
| H01S 3/067 | (2006.01) |
| H01S 3/10 | (2006.01) |
| H01S 3/0941 | (2006.01) |

(52) U.S. Cl.
CPC .... *H01S 3/094076* (2013.01); *H01S 3/06758* (2013.01); *H01S 3/10007* (2013.01); *H01S 3/09415* (2013.01); *H01S 3/094003* (2013.01); *H01S 3/10015* (2013.01); *H01S 3/10038* (2013.01); *H01S 3/10069* (2013.01)

(58) Field of Classification Search
CPC .......... H01S 3/06758; H01S 3/094003; H01S 3/094076; H01S 3/09415; H01S 3/10007; H01S 3/10015; H01S 3/10038; H01S 3/10069; H01S 3/13; H01S 3/00; H04B 10/25; B23K 26/00
USPC ...... 219/121.6–121.62; 372/25, 30; 359/333, 359/341.1, 341.3
See application file for complete search history.

(56) References Cited

U.S. PATENT DOCUMENTS

| | | |
|---|---|---|
| 4,166,985 A | 9/1979 | White et al. |
| 4,264,870 A | 4/1981 | Avicola |
| 4,503,403 A | 3/1985 | Taylor et al. |

(Continued)

FOREIGN PATENT DOCUMENTS

WO    WO 2014/152766    9/2014

OTHER PUBLICATIONS

Office action dated Jan. 26, 2017, for related U.S. Appl. No. 15/197,443, 11 pages.

(Continued)

*Primary Examiner* — Michael G Hoang
(74) *Attorney, Agent, or Firm* — Klarquist Sparkman, LLP

(57) ABSTRACT

Pulsed fiber lasers that amplify seed laser pulses include pump laser drivers that produce simmer currents during periods in which the seed pulse is suspended, and forward currents associated with steady state pulse amplification. By suitable selection of simmer currents, initiation of a series of seed pulses produces pulse-to-pulse output powers with suitable power variation.

27 Claims, 12 Drawing Sheets

(56) References Cited

U.S. PATENT DOCUMENTS

| | | |
|---|---|---|
| 4,608,697 A | 8/1986 | Coldren |
| 4,635,246 A | 1/1987 | Taylor et al. |
| 4,866,720 A | 9/1989 | Holly |
| 5,570,227 A | 10/1996 | Nabeyama et al. |
| 5,778,015 A | 7/1998 | Gunning et al. |
| 5,778,016 A | 7/1998 | Sucha et al. |
| 5,812,569 A | 9/1998 | Walker et al. |
| 5,982,789 A * | 11/1999 | Marshall .............. G02F 1/39 372/22 |
| 5,987,042 A | 11/1999 | Stayer et al. |
| 6,208,672 B1 | 3/2001 | Gunning et al. |
| 6,243,195 B1 | 6/2001 | Pedersen et al. |
| 6,590,922 B2 | 7/2003 | Onkels et al. |
| 6,661,820 B1 | 12/2003 | Camilleri et al. |
| 6,807,001 B1 | 10/2004 | Ranka et al. |
| 6,980,574 B1 | 12/2005 | Yin et al. |
| 7,324,788 B2 | 1/2008 | Ramet et al. |
| 7,391,794 B2 | 6/2008 | Kane |
| 7,582,848 B2 | 9/2009 | Smart |
| 7,608,808 B2 | 10/2009 | Kuramoto |
| 7,964,819 B2 | 6/2011 | Bruland |
| 8,160,113 B2 | 4/2012 | Adams et al. |
| 8,254,419 B1 | 8/2012 | Savage-Leuchs et al. |
| 8,532,151 B2 | 9/2013 | Li et al. |
| 2002/0097761 A1 | 7/2002 | Sucha et al. |
| 2002/0114370 A1 | 8/2002 | Onkels et al. |
| 2002/0196823 A1 | 12/2002 | Nakao et al. |
| 2003/0197918 A1 | 10/2003 | Ng et al. |
| 2003/0202168 A1 | 10/2003 | Barenz et al. |
| 2004/0190119 A1 | 9/2004 | Tauser et al. |
| 2007/0064747 A1 | 3/2007 | Feve et al. |
| 2007/0223544 A1 | 9/2007 | Yamazaki et al. |
| 2007/0268940 A1 | 11/2007 | Luo et al. |
| 2008/0089369 A1 | 4/2008 | Luo et al. |
| 2008/0157695 A1 * | 7/2008 | Lantis ................. H05B 41/32 315/246 |
| 2009/0016387 A1 * | 1/2009 | Durkin ................ G02B 6/024 372/25 |
| 2009/0046746 A1 | 2/2009 | Munroe et al. |
| 2009/0086773 A1 * | 4/2009 | Murison ............ H01S 3/06754 372/20 |
| 2009/0296755 A1 | 12/2009 | Brown et al. |
| 2010/0038558 A1 | 2/2010 | Yamazoe |
| 2010/0189136 A1 | 7/2010 | Gapontsev et al. |
| 2010/0189141 A1 | 7/2010 | Zhang et al. |
| 2011/0058250 A1 * | 3/2011 | Liu .................... G02B 6/14 359/341.3 |
| 2011/0062127 A1 | 3/2011 | Gu et al. |
| 2011/0085576 A1 | 4/2011 | Crawford et al. |
| 2011/0122912 A1 | 5/2011 | Benjamin et al. |
| 2011/0142084 A1 | 6/2011 | Reid et al. |
| 2012/0087386 A1 | 4/2012 | Brown et al. |
| 2012/0116371 A1 | 5/2012 | Boutoussov et al. |
| 2012/0242973 A1 | 9/2012 | Tünnermann et al. |
| 2013/0114627 A1 | 5/2013 | Filgas et al. |

OTHER PUBLICATIONS

First Office Action from Chinese Patent Application No. 201410044843.1, dated May 30, 2016, 20 pages (with English translation).

Koechner, "Solid State Laser Engineering," Springer Science & Business Media, NY, 5:268-270 (2006).

Final Office action dated Jul. 17, 2014, from U.S. Appl. No. 13/835,354, 18 pages.

Final Office action dated Feb. 3, 2015, from U.S. Appl. No. 13/758,904, 18 pages.

International Search Report and Written Opinion from International Application No. PCT/US2014/027709, dated Sep. 12, 2014, 10 pages.

Johann Nilsson, "High-power fiber lasers: Surge to power," SRC Annual Meeting, pp. 21-23, Sep. 19-21, 2005.

Margalit et al., "Injection locking of an actively mode-locked semiconductor laser," Optics Letters, 19(24): 2125-2127 (Dec. 15, 1994).

Office action dated Feb. 4, 2014, from U.S. Appl. No. 13/835,354, 15 pages.

Office action dated Apr. 10, 2014, from U.S. Appl. No. 13/758,904, 16 pages.

Office action dated Dec. 26, 2014, from U.S. Appl. No. 13/835,354, 20 pages.

Seo et al., "Timing jitter reduction of gain-switched DFB laser by external injection-seeding," Elec. Lett. 32(1): 44-45 (Jan. 4, 1996).

* cited by examiner

FIG. 3

| DATA TABLE FOR PULSE WIDTH N |||| 306
| DATA TABLE FOR PULSE WIDTH 2 |||| 304
| DATA TABLE FOR PULSE WIDTH 1 ||||
| POWER | REP RATE | SIMMER CURRENT | FWD CURRENT |
| LOW | 1 KHZ | $I_{SIMMER}(1KHZ)$ | $I_{FWD}(1KHZ)$ |
| ... | ... | ... | ... |
| HIGH | 100 MHZ | $I_{SIMMER}(100MHZ)$ | $I_{FWD}(100MHZ)$ |

302  300

| DATA TABLES FOR POWER 3 ||| 406
| DATA TABLES FOR POWER 2 ||| 404
| DATA TABLES FOR POWER 1 |||
| REP RATE | SIMMER CURRENT | FWD CURRENT |
| 1 KHZ | $I_{SIMMER}(1KHZ)$ | $I_{FWD}(1KHZ)$ |
| ... | ... | ... |
| 100 MHZ | $I_{SIMMER}(100MHZ)$ | $I_{FWD}(100MHZ)$ |

ALGORITHMS FOR RAPID GATING OF SEED SUSPENDABLE PULSED FIBER LASER AMPLIFIERS

CROSS REFERENCE TO RELATED APPLICATION

This application claims the benefit of U.S. Provisional Application No. 61/952,659, filed on Mar. 13, 2014, which is hereby incorporated by reference in its entirety.

FIELD

The disclosure pertains to pulsed fiber lasers and amplifiers.

BACKGROUND

Fiber amplifiers can be used to amplify seed laser pulses, and produce output pulses of various powers, pulse durations and at variable pulse repetition frequencies. Fiber amplifiers thus permit optical pulses to be configured for a variety of material processing applications. Unfortunately, if seed pulse amplification is suspended, initiation of a new pulse sequence tends to produce pulses of varying pulse powers that are not well suited for laser processing.

SUMMARY

In some examples, laser systems comprise a seed laser and a doped fiber situated to receive optical pulses from the seed laser. A pump laser is coupled to the doped fiber so as to deliver pump optical radiation to the doped fiber to produce optical gain. A pulse controller is coupled to the seed laser to signal initiation of a series of seed pulses, and to the pump laser so as to switch a pump laser drive current from a simmer current to a forward current upon initiation of the seed laser optical pulses. The simmer current is selected to produce a gain for a first seed laser pulse in the series of seed laser pulses that corresponds to a saturated gain associated with exposure to the series of seed pulses produced with a forward current. In representative embodiments, a memory stores simmer current values, and programmable logic is configured to obtain a simmer current value based on the stored simmer current values. In other examples, the programmable logic is configured to obtain one or more simmer current values based on interpolation using two or more simmer current values stored in the memory. The programmable logic obtains the simmer current values based an average power, and in some examples, on at least one of a pulse repetition frequency, a pulse energy, a pulse duration, and a pulse power. In some embodiments, the simmer current is selected so that a first pulse in a pulse sequence has a pulse power that is within ±10% of a steady state pulse power produced with a selected forward pump current. In typical examples, the active fiber is an erbium, ytterbium, neodymium, dysprosium, praseodymium, or thulium-doped single mode optical fiber. In some applications, a workpiece stage is situated to retain a substrate so as to receive the series of pulses.

Laser systems include a pump laser driver coupled to switchably provide a forward drive current and a simmer drive current to a pump laser. A laser system controller initiates a seed laser pulse train and communicates switching between the simmer current and the forward current at the pump laser driver. In representative examples, the laser system controller is coupled to a memory and establishes the simmer current based on a simmer current database. In still other embodiments, the simmer current is selected so that a first pulse in an initiated pulse train and all subsequent pulses have pulse power that is within at least ±10%, least ±5%, or least ±1% of a steady state pulse power. In still other examples, a digital to analog convertor receives a digital value associated with the simmer current, and converts the digital value into an analog value so that a corresponding analog value is coupled to the pump laser driver. In additional examples, the laser system controller determines a selected simmer current by retrieving two or more simmer current and average power value pairs and interpolating based on the retrieved values.

Methods comprise applying a simmer current to a pump laser of a fiber amplifier and initiating a series of seed pulses and directing the seed pulses to the fiber amplifier. A pump laser current is switched from a simmer current to a forward current in association with initiating the series of seed pulses. In some examples, the pump laser current is switched prior to initiating the series of seed pulses or after initiating the series of seed pulses. In further examples, the simmer current is determined based on stored simmer current values or based on interpolation among stored simmer current values. In other representative examples, the applied simmer current is selected based on a desired pulse output power. In still other examples, an amplified series of seed pulses associated with the simmer current and the forward current is directed to a workpiece.

The foregoing and other objects, features, and advantages of the technology will become more apparent from the following detailed description, which proceeds with reference to the accompanying figures.

BRIEF DESCRIPTION OF THE DRAWINGS

FIG. 3 illustrates a representative data table that contains simmer currents for a selected power level.

FIG. 4 illustrates an additional data array that includes data table sets for respective output powers, wherein each data table set includes data tables for a plurality of pulse durations.

FIGS. 6A-8B illustrate representative data measurements used to acquire simmer current values.

DETAILED DESCRIPTION

Figure 1:
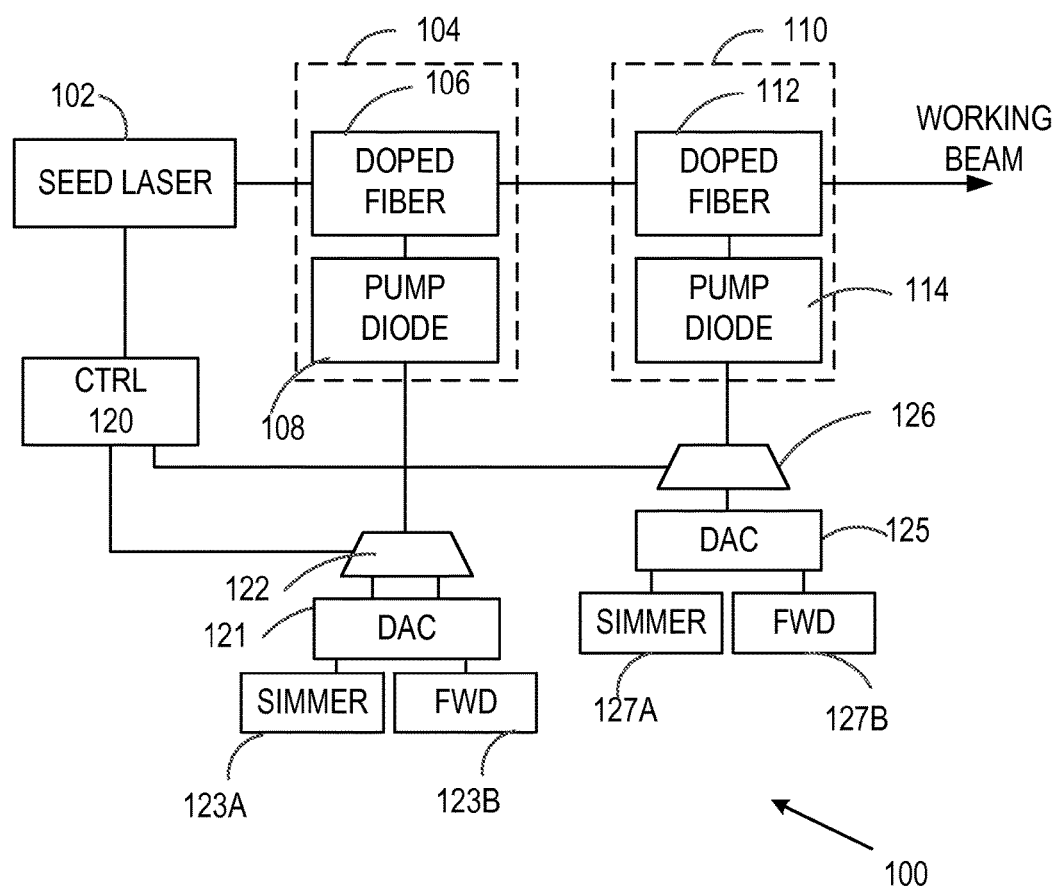
FIG. 1 is a block diagram of a pulsed fiber laser system that includes a seed laser and a fiber amplifier.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Some examples refer to a seed lasers and seed pulses. As used herein, a seed laser pulse is an output of seed laser that is directed to an optical amplifier or optical oscillator for amplification. A seed laser pulse is generally selected to be at or near a maximum of a gain bandwidth of an optical amplifier or an optical oscillator. Although some examples describe seed pulses and subsequent amplification, seed pulses can be used for some applications without additional amplification. The examples described below are based on laser diodes and doped optical fibers, and the associated wavelengths and wavelength ranges. Other types of lasers and optical amplifiers can be used based on solid state or other optical gain materials. For example, microchip lasers based on sections of solid state laser media can be used as seed lasers. Typical seed laser pulse durations are between 1 ps and 100 ns and are produced at repetition rates corresponding to an isolated single pulse to 100 MHz. In the examples below, based on laser diodes, DC and pulsed currents are supplied to pump the laser diodes so as to seed or pump the doped fiber. Such currents are referred to as drive currents or pump currents. For other laser systems, different types of pumping are necessary.

In many applications, laser pulses are applied to various kinds of substrates to perform ablative, non-ablative, or other types of processing. A series of laser pulses is applied, and then laser pulses are discontinued until needed. It can be efficient to discontinue the production of laser pulses when the pulses are not needed. However, when pulses are re-initiated, it is preferred that the initial pulses in a new series have substantially the same characteristics as later pulses. For fiber laser systems in which a seed laser pulse is amplified to produce a working pulse, amplifier gain is not reduced by seed pulses when the pulses are discontinued or suspended. As a result, amplifier gain can grow so that the initial pulses of a subsequent series have more pulse energy than subsequent pulses. If amplifier gain is reduced to avoid these large initial pulse energies, the initial pulses will have too little energy and an appreciable time may be needed for the amplifier gain to be returned to higher operational values. In some systems, seed pulses are kept active during times when pulses are not needed to reduce the risk of over energizing an amplifier. As a result, working pulses can be generated during undesired times and with undesired characteristics, such as peak powers or fluences that are less than suitable.

The examples described below generally include one or more actively doped fiber pre-amplifiers or amplifiers that are arranged in series to produce output laser pulses by amplifying seed pulses from a seed laser. Fiber preamplifiers and amplifiers typically include a length of an optical fiber doped with one or more rare-earth elements such as erbium, ytterbium, neodymium, dysprosium, praseodymium, or thulium. The fiber is usually a single mode fiber, but may be designed to have a large core (i.e., a core diameter of up to 10 µm, 15 µm, 20 µm, 30 µm, 50 µm, or more). The actively doped fiber can be a polarization retaining fiber as well. Gain is conveniently established in a doped fiber by pumping with one or more semiconductor lasers. In some cases, laser diode radiation is coupled into one or both ends of an active fiber. Seed lasers can be microchip lasers, semiconductor lasers, or other lasers that produce optical pulses within a gain bandwidth of the actively doped fibers.

As used herein, saturated gain or saturated optical gain refers to optical gain realized in a pumped fiber amplifier in response to a series of seed laser pulses that are amplified. In some cases, several pulses of a series of seed laser pulses are needed to reduce gain to a value corresponding to the saturated gain. In typical examples, saturated gain corresponds to gain produced in a doped fiber pumped with a laser diode current referred to as a forward current after exposure to a lengthy series of seed pulses. Optical radiation, laser pulses and the like refer to propagation electromagnetic radiation at wavelengths between 100 nm and 10 µm. and typically at wavelengths set by fiber dopants.

Referring to FIG. 1, a pulsed fiber laser system 100 includes a seed laser 102 that directs seed laser pulses to a first fiber amplifier 104 and a second fiber amplifier 110 to produce a working beam. The first fiber amplifier 104 includes one or more pump laser diodes 108 that direct pump radiation in one or more beams to a doped fiber 106. The second fiber amplifier 110 includes one or more pump laser diodes 114 that direct pump radiation in one or more beams to a doped fiber 112. Additional amplifiers can be provided to increase gain, if desired. For convenience, a final amplifier in a series is sometimes referred to as a power amplifier, while other amplifiers are referred to as preamplifiers.

A controller (such a microprocessor-based controller) 120 is coupled to the seed laser 102 for selection of seed pulse power, pulse repetition rate (PRF), pulse duration, or other seed pulse characteristics. In addition, the controller 120 can enable, initiate, or disable production of seed pulses. The controller 120 is also coupled to analog multiplexors (MUXes) 122, 126 that are coupled to digital to analog convertors (DACs) 121, 125 associated with the first fiber amplifier 104 and the second fiber amplifier 110, respectively. The MUX 122 directs a selected value of pump laser current (or an associated value) such as a simmer current or a forward current stored in memory portions 123A, 123B, respectively, from the DAC 121 to the pump diode 108 so as to establish a simmer current or a forward current in the pump laser 108. The MUX 126 directs a selected value of pump laser current (or an associated value) such as a simmer current or a forward current stored in memory portions 127A, 127B, respectively, from the DAC 125 so as to establish a simmer current or a forward current in the pump laser 114.

The forward currents are generally selected to produce suitable output pulses at amplifier stage outputs or directly in the working beam in time periods associated with constant (or nearly constant) receipt of seed pulses. In such time periods, amplifier gains can be set via pump laser powers to produce a working beam with suitable pulse energies, pulse powers, or average power at a selected PRF. During these time periods, fiber amplifier optical gain is typically reduced due to the seed pulses.

The simmer currents are generally selected to produce suitable output pulses at amplifier stage outputs or directly in the working beam in time periods associated with transition from an off state time period in which no seed pulses have been received to an active state in which repetitive seed pulses are received. In such time periods, amplifier gains can be set via pump laser drive currents to produce a working beam with suitable pulse energies, pulse powers, or average power at a selected PRF in an initial pulse (or set of initial pulses) corresponding to the transition from a low power (or zero power) working beam to a higher (or normal) working beam power. During time periods in which no seed pulses (or low power seed pulses) are received fiber amplifier optical gain is typically set so that initial pulses have the desired pulse energies/powers. Simmer currents can also be selected to produce suitable output pulses at amplifier stage outputs or directly in the working beam in time periods associated with transition from an on state time period in which final seed pulses of a sequence are being received to an off state in which no seed pulses are received. In most practical examples, simmer currents are provided to one or more amplifier stages so that the initial pulses and final pulses are satisfactory. Simmer currents are generally less than forward currents and are selected to avoid undesirable laser oscillation or other working beam outputs.

Figure 2:
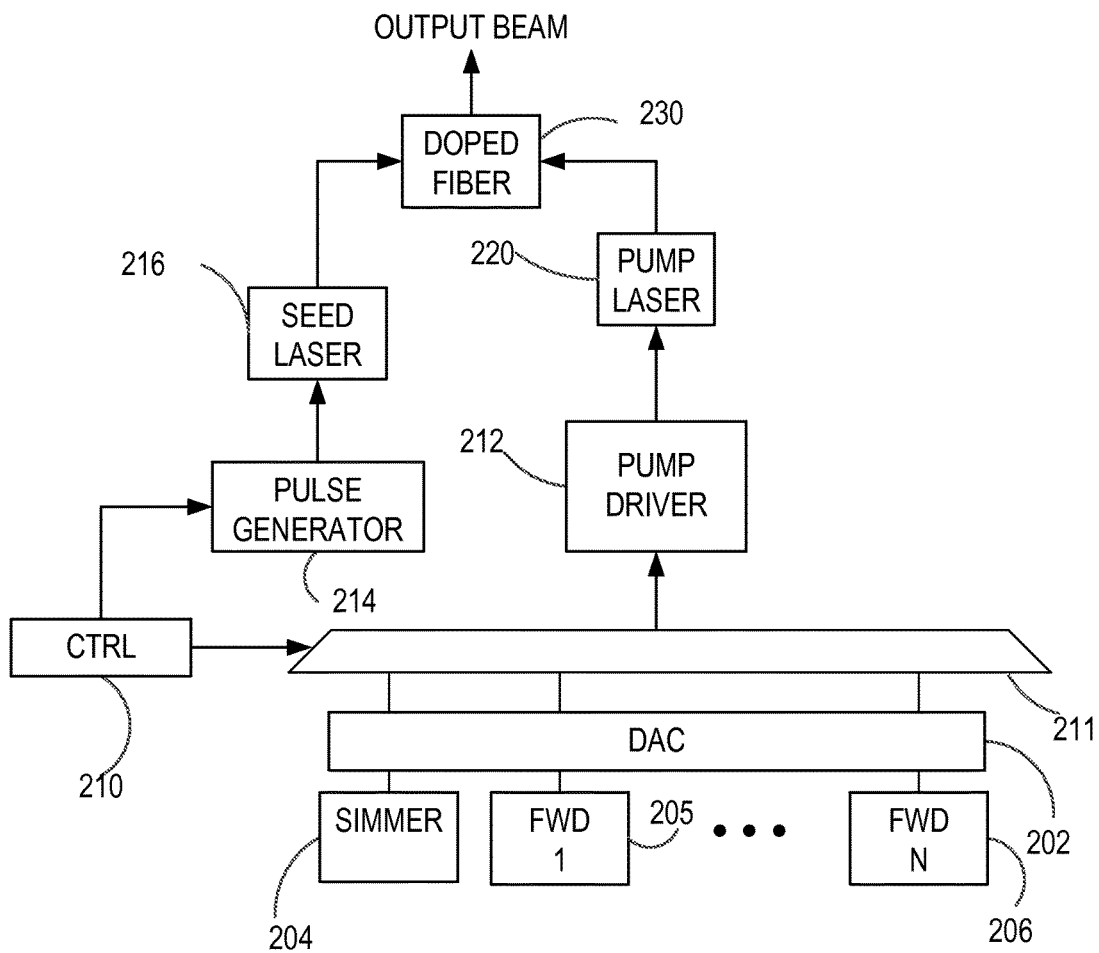
FIG. 2 illustrates laser system controller that switches a pump laser current from a simmer current to a forward current upon initiation of a series of seed pulses after a period is which seed pulse generation or amplification is suspended.

More than one simmer current or forward current can be applied to pump lasers to define pump laser transition from an off state to an on state. Referring to FIG. 2, a DAC 202 is coupled to establish simmer current and forward current values based on corresponding simmer and forward current assignments stored in memory portions 204, 205, 206. These values are coupled from the DAC 202 to an analog MUX 211 and a controller 210 is coupled to the MUX 211 so that a selected value of forward or simmer current can be produced by the pump driver 212. A plurality of simmer and/or forward currents can be provided, and a transition from a laser system off state to an on state can be associated with coupling a sequence of stored current values (simmer or forward currents) during a transition period. A number N of forward currents is illustrated schematically in FIG. 2, but additional simmer current values (i.e., current values applied prior to seed pulse initiation) can be used, with or without multiple forward current values. A pump laser 220 receives the selected pump current from the pump driver 212 as directed by the controller 210. The controller 210 is also coupled to a pulse generator 214 that initiates pulses in seed laser 216. A doped fiber 230 receives pump radiation from the pump laser 220 (at either simmer or forward current values) and seed pulses from the seed laser 216. In the absence of seed pulses, the controller 220 selects a simmer current value, and when seed pulses are generated, the controller 220 selects a forward current value.

Suitable simmer and forward current values can be established based on pulse measurements. FIG. 3 illustrates a representative data table 300 that is stored in memory for selected power levels. Pulse width data tables 302, 304, 306 include simmer and forward current values for a variety of PRFs and pulse durations for a selected output power. (Similar data tables can be obtained for selected output pulse energies.) Simmer currents can be determined by observing laser pulse output at an off/on transition as a function of pump laser power as described in detail below. FIG. 4 illustrates an additional data array 400 that includes data table sets 402, 404, 406 for respective output powers, wherein each data table set includes data tables for a plurality of pulse durations. For examples in which PRF and pulse duration are fixed, measured values of simmer currents for several output powers are sufficient. In general, a few PRF, pulse durations, and output powers can be recorded, and simmer currents for other values can be obtained by interpolation from the measured values. In some embodiments, data tables are obtained for each fixed pulse duration/PRF combination of interest, and laser power levels are associated with a forward current. Simmer current can then be obtained based on the forward current value or the selected laser power.

Figure 5:
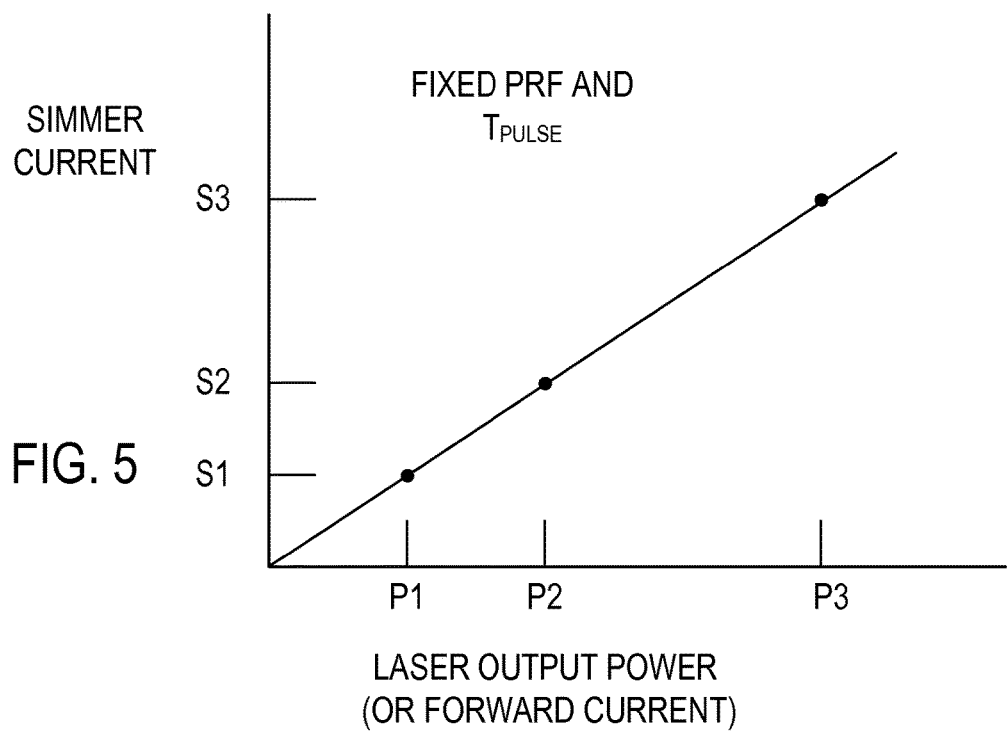
FIG. 5 is a graph of simmer current as a function of output power based on measured simmer current values.

FIG. 5 is a graph of simmer current as a function of output power based on measured simmer current values S1, S2, S3 obtained at respective output powers P1, P2, P3. For the graph of FIG. 5, PRF and pulse duration $T_{PULSE}$ are fixed. For more complex relationships between simmer current and output power, additional data can be collected or more complex interpolation procedures can be used to obtained values for which measurements are not available. In some examples, a forward current to simmer current lookup table is used, but simmer current can be obtained using a variety of input parameters stored in data tables, or based on interpolation of such data.

Figure 6A:
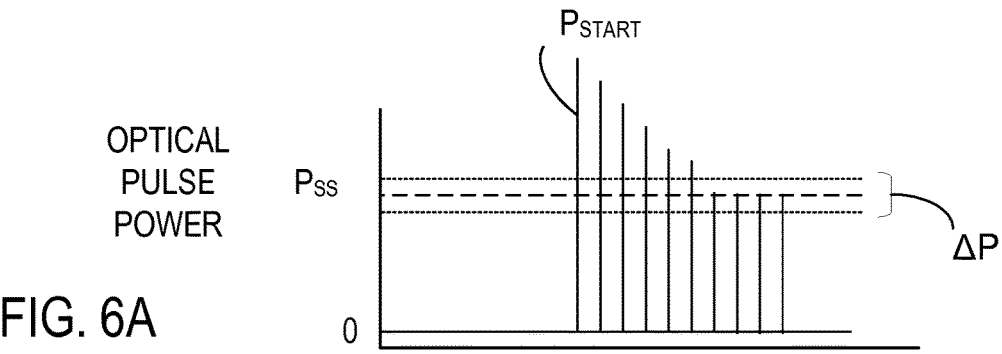
Figure 6B:
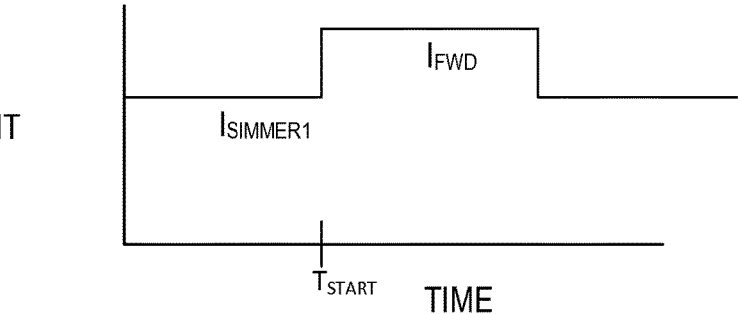
Figure 7A:
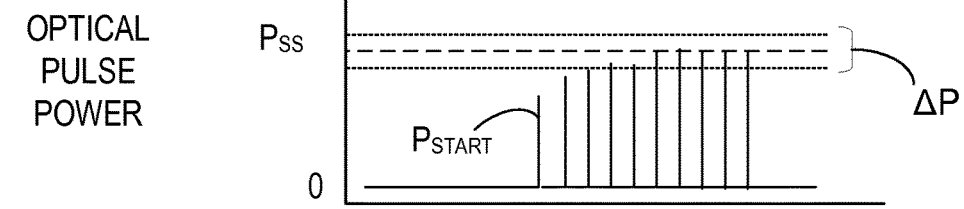
Figure 7B:
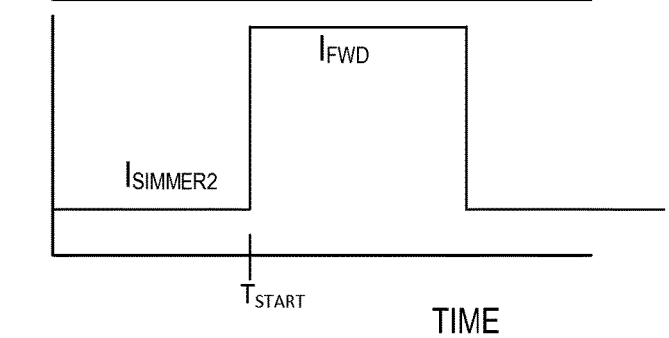
Figures 8A, 8B:
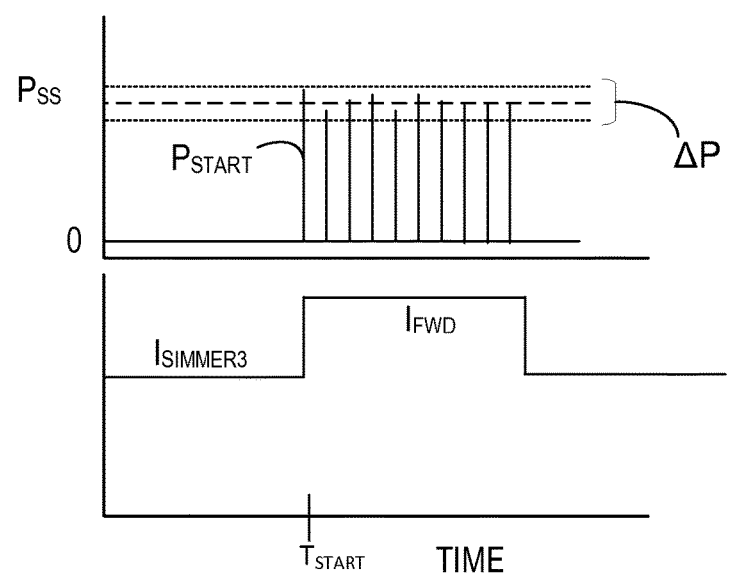

FIGS. 6A-8B illustrate representative data measurements used to acquire simmer current values. For all of FIGS. 6A-8B, PRF, forward current $I_{FWD}$, steady state pulse peak power $P_{SS}$, and pulse duration are constant. Optical pulses amplitudes (pulse powers) are shown as vertical lines for purposes of illustration—actual pulse shapes will be different. On the time scale in these figures, pulses can appear as impulse-like. An optical pulse sequence is initiated at $T_{START}$ at which time laser pump current transitions for a simmer value to a forward value. Referring to FIGS. 6A-6B, for a first simmer current $I_{SIMMER1}$, an initial pulse power $P_{START}$ upon initiation of seed pulses exceeds a target power range $\Delta P$ about the steady state pulse peak power $P_{SS}$. The power range $\Delta P$ can be ±20%, 10%, 5%, 2%, 1%, or 0.5% of the steady state pulse peak power $P_{SS}$. Referring to FIGS. 7A-7B, for a second simmer current $I_{SIMMER2}$, an initial pulse power $P_{START}$ upon initiation of seed pulses is lower than the target power range ΔP about the steady state pulse peak power $P_{SS}$. Referring to FIGS. 8A-8B, for a third simmer current $I_{SIMMER3}$, an initial pulse power $P_{START}$ upon initiation of seed pulses is within the target power range ΔP, and this simmer current can be stored for inclusion in a data table. However, in some cases, a first few pulses of a newly initiated pulse series can be outside a selected target power range ΔP, and simmer current is selected to bring these first few pulses so as to be close to steady state pulse powers.

Figure 9:
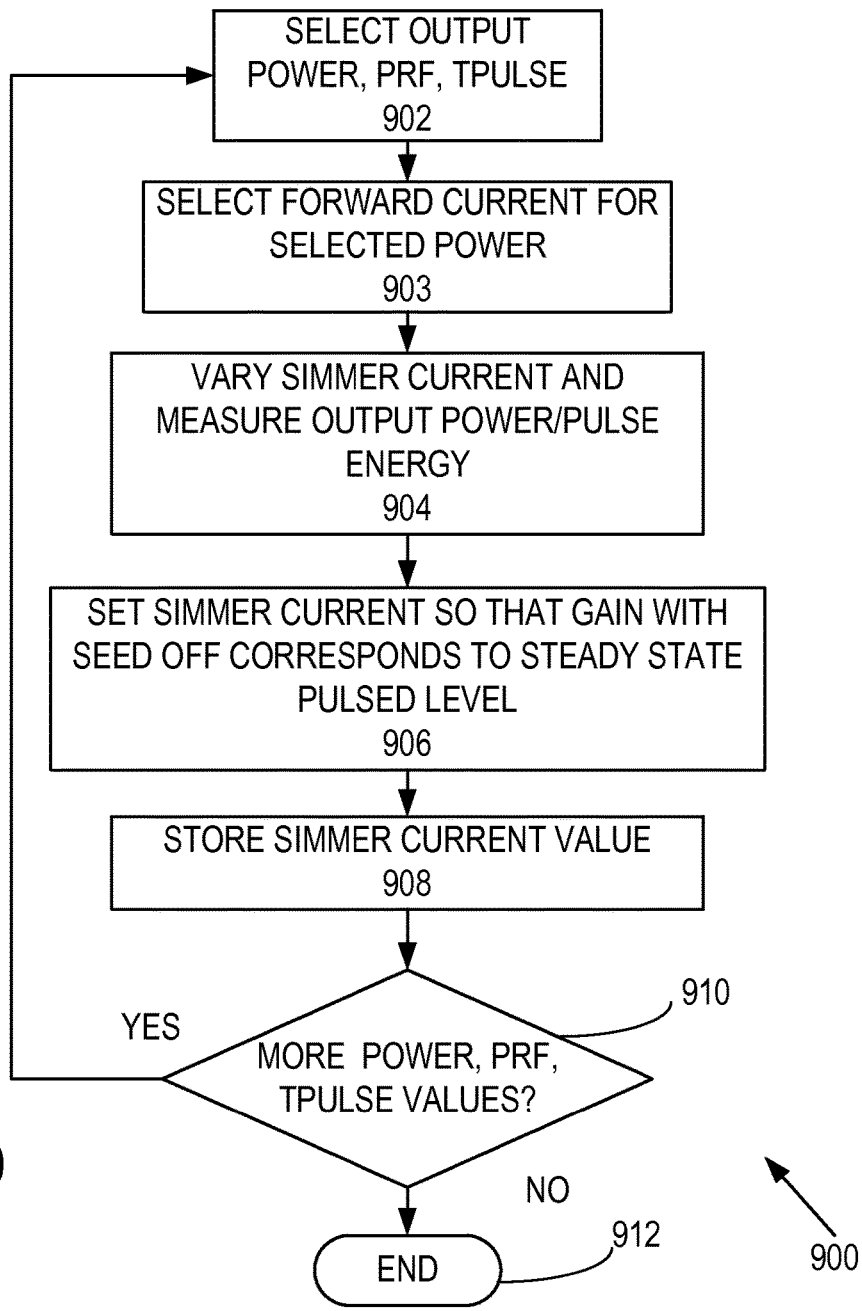
FIG. 9 illustrates a representative method of acquiring simmer current data tables.

With reference to FIG. 9, a representative method 900 of acquiring simmer current data tables includes selecting laser output parameters such as PRF, average power, peak power, or pulse duration at 902. At 903, forward current is selected for the selected power. At 904, a simmer current is varied with a fixed forward current, and laser output pulse power is measured. At 906, a simmer current is selected so that an initial pulse or pulses in a pulse sequence has a suitable power within a predetermined range. This can be done by visual inspection of oscilloscope data, or other procedure. Alternatively, simmer current is selected to provide a gain corresponding to saturated gain during a steady state or approximately steady state portion of a pulse sequence. A suitable simmer current is stored in a memory device at 908 (along with other laser characteristics selected at 902). At 910, a determination of whether additional simmer current values are to be obtained is made. If more data is desired, the method 900 returns to 902; otherwise, data acquisition ends at 912.

Figure 10:
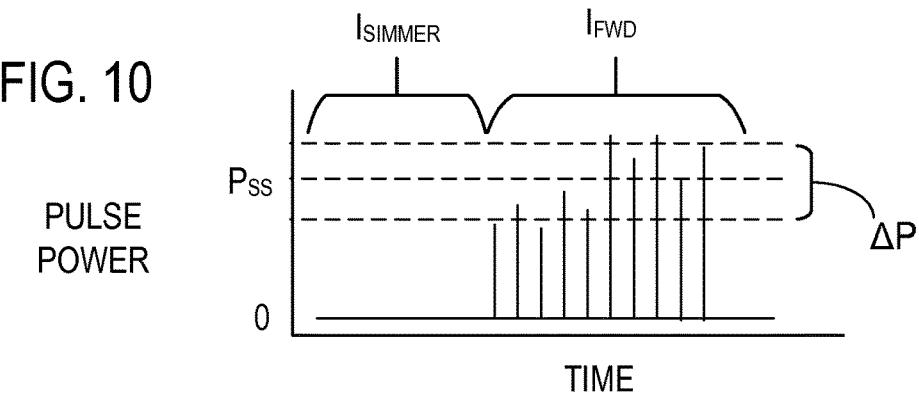
FIG. 10 illustrates laser pulse power upon switching pump laser drive from a simmer current to a forward current.
Figure 11:
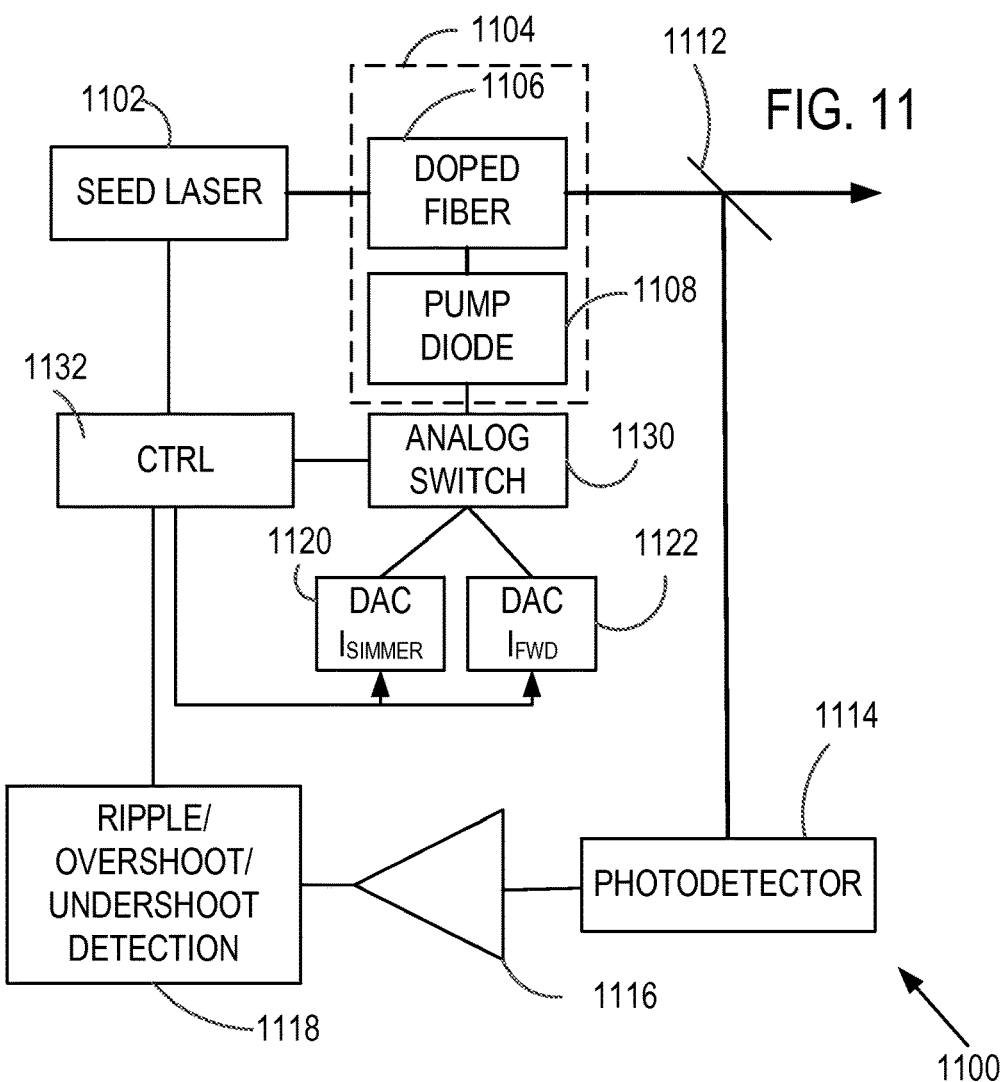
FIG. 11 illustrates an apparatus suitable for acquiring simmer current values and laser system operation based on such values.

FIG. 10 illustrates laser pulse power upon switching pump laser drive from a simmer current to a forward current. As shown in FIG. 10, output pulse power varies and this variation can be used to adjust or establish a simmer current. Typically, pulse power variations are to be within a range ΔP about a target power $P_{SS}$. Referring to FIG. 11, an apparatus 1100 suitable for acquiring simmer current values (and operation based on such values) includes a seed laser 1102 that is coupled to a fiber amplifier 1104 that includes a doped fiber 1106 and a pump laser 1108. A beamsplitter or fiber coupler 1112 transmits a working beam and directs a portion of the working beam to a photodetector 1114. The photodetector output is coupled to a buffer amplifier 1116 and then to a ripple/overshoot/pulse amplitude analyzer 1118. In some examples, the analyzer 1118 is configured to determine if a simmer current is satisfactory based on initial pulse peak powers or ripple or overshoot in peak powers. A control system 1132 is coupled to the analyzer 1118 and to an analog switch 1130 so as to switch pump laser current coupled to the pump laser 1108 to a simmer or forward current value based on values produced by DACs 1120, 1122, respectively. Based on a determination by the analyzer 1118, the control system 1132 can also store or retrieve simmer or forward current values in memory. Only a single fiber amplifier is shown in FIG. 11, but two, three, or more can be coupled in series or parallel.

Figure 12:
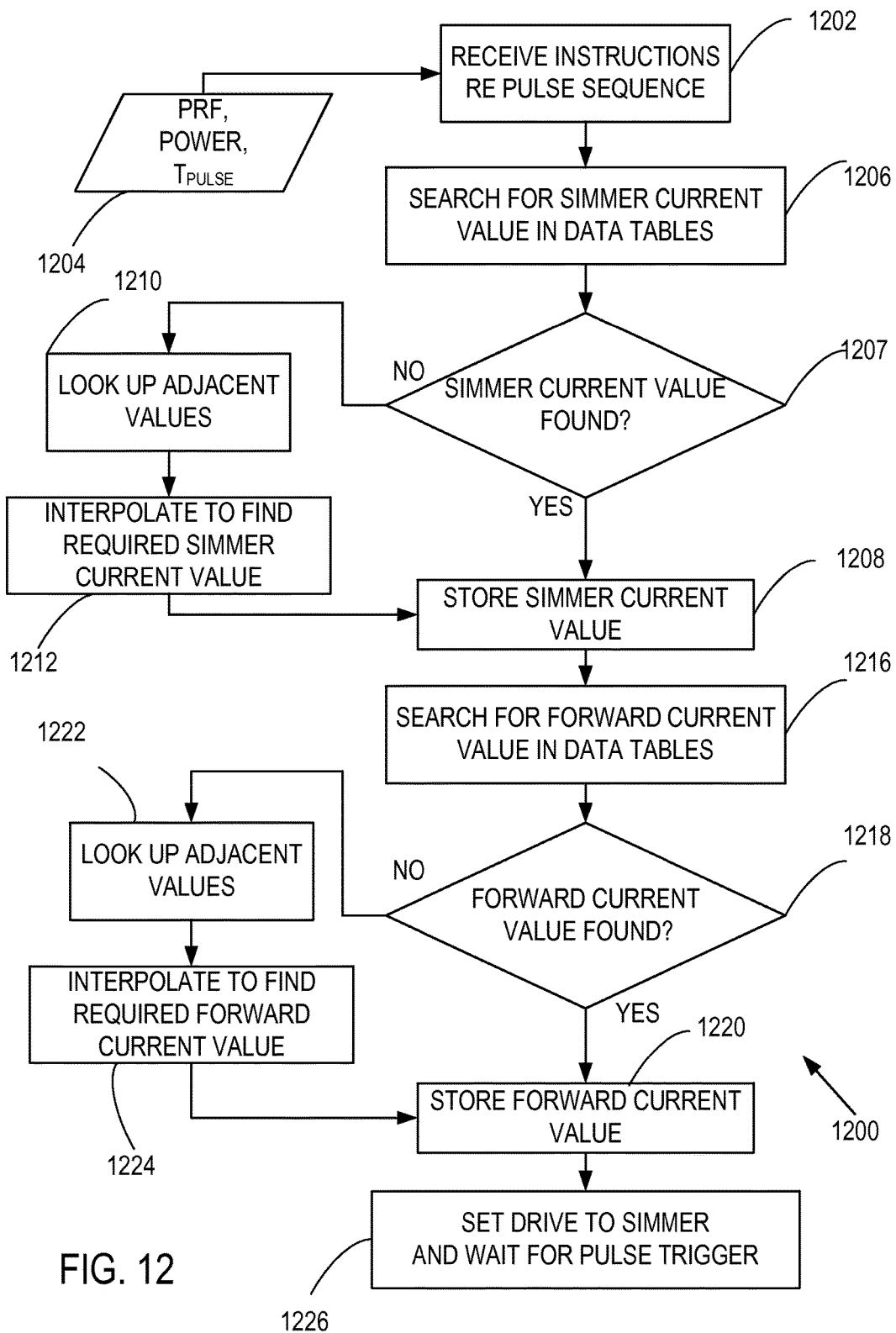
FIG. 12 illustrates a method of producing optical pulses using a simmer current.

Referring to FIG. 12, a method 1200 of producing optical pulses includes receiving configuration instructions concerning a selected pulse sequence at 1202. In some examples, pulse parameters are retrieved from a database 1204 that includes suitable combinations of PRF, pulse duration, pulse power, and average power. At 1206, a data table is queried to find a suitable value of simmer current. If a value is found at 1207, the simmer current value is stored at 1208. Otherwise, adjacent or other values of simmer current are retrieved at 1210, and at 1212 the retrieved values are interpolated to find the simmer current value that is stored at 1208. At 1216, the data table 1204 is queried to find a suitable value of forward current. If a value is found, at 1218 a forward current value is then stored at 1220. Otherwise, adjacent or other values of forward current are retrieved at 1222, and at 1224 the retrieved values are interpolated to find the forward current value that is stored at 1220. At 1226, pump laser drive current is set to the selected simmer current to await a signal to initiate pulse generation.

Figure 13:
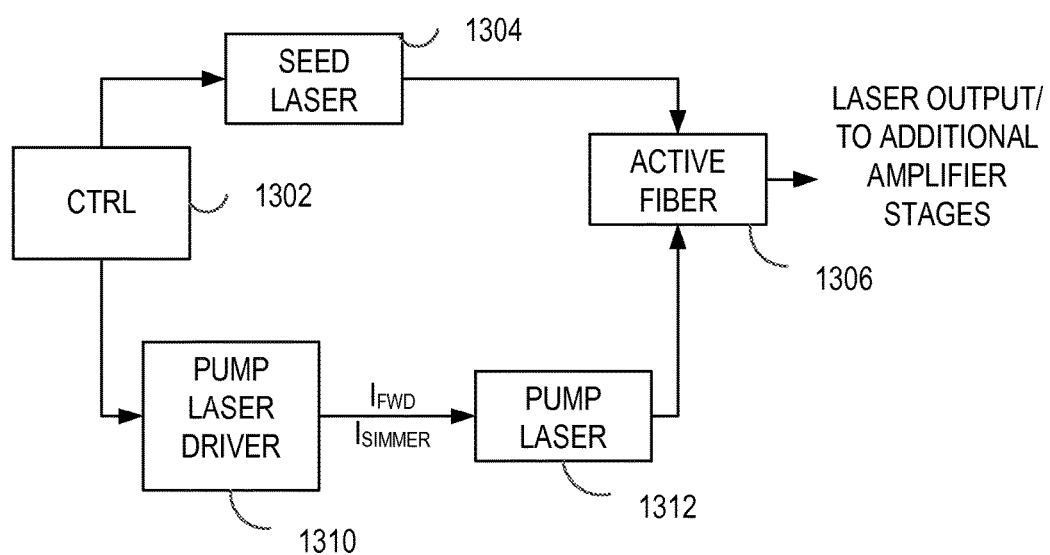
FIG. 13 illustrates a simplified amplifier/seed laser system.

Referring to FIG. 13, a simplified amplifier/seed laser system includes a seed laser 1304 that couples an output seed pulse to an active fiber 1306. A pump laser driver 1310 directs a simmer current or a forward current to a pump laser diode 1312 that couples a pump beam to the active fiber 1306. A controller 1302 is in communication with the pump laser driver 1310 so as to select an appropriate pump laser drive current and is in communication with the seed laser 1304 so as to initiate, control, or terminate production of seed pulses. Typically, a pump laser drive current is switched from a simmer current to a forward current as a pulse sequence is initiated. The controller 1302 is also coupled to the seed laser 1304 to control pulse generation and coordinate with simmer/forward current values.

Figure 14:
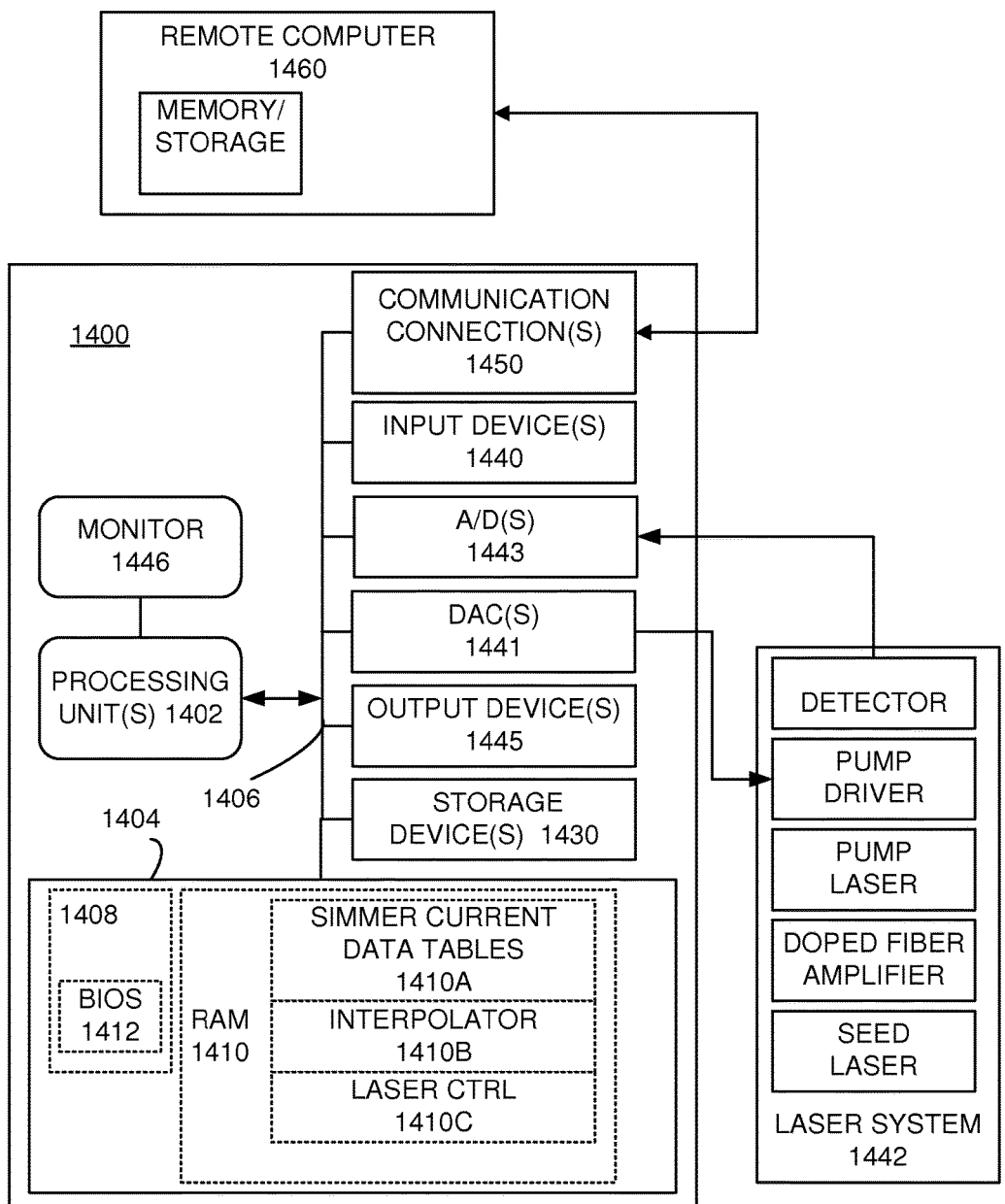
FIG. 14 is a block diagram of a representative computing system or other programmable logic for use with the disclosed methods and apparatus.

FIG. 14 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC), dedicated processor, or other digital processing system or programmable logic. Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, dedicated processors, field programmable gate arrays, complex programmable logic devices, systems on a chip, and the like. The disclosed technology may also be practiced in distributed computing environments where tasks are performed by remote processing devices that are linked through a communications network. In a distributed computing environment, program modules may be located in both local and remote memory storage devices.

With reference to FIG. 14, an exemplary system for implementing the disclosed technology includes a computing device 1400 that includes one or more processing units 1402, a system memory 1404, and a system bus 1406 that couples various system components including the system memory 1404 to the one or more processing units 1402. The system bus 1406 may be any of several types of bus structures including a memory bus or memory controller, a peripheral bus, and a local bus using any of a variety of bus architectures. The exemplary system memory 1404 includes read only memory (ROM) 1408 and random access memory (RAM) 1410. A basic input/output system (BIOS) 1412, containing the basic routines that help with the transfer of information between elements within the computing device 1400, is stored in ROM 1408.

The exemplary computing device 1400 further includes one or more storage devices 1430 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1406 by a hard disk drive interface, a magnetic disk drive interface, and an optical drive interface, respectively. The drives and their associated computer-readable media provide nonvolatile storage of computer-readable instructions, data structures, program modules, and other data for the computing device 1400. Other types of non-transitory computer-readable media which can store data that is accessible by a PC, such as magnetic cassettes, flash memory cards, digital video disks, CDs, DVDs, RAMs, ROMs, and the like, may also be used in the exemplary operating environment. As shown in FIG. 14, the computing device 1400 is coupled to one or more digital to analog convertors (DACs) 1441 so that suitable laser currents are provide to laser pump diodes so as to establish gain and/or power levels in a laser system 1442. Analog to digital convertors (A/Ds) 1443 are coupled to the bus 1406 so that data values such as optical pulse powers can be stored as digital values. In some cases, current values needed for selected repetition rates, output powers, pulse widths or other laser output characteristics are not stored, and one or more stored values are interpolated to obtain suitable current values. As shown in FIG. 14, data tables are stored in a memory 1410A, interpolation instructions are stored in a memory 1410B, and laser control instructions for setting PRF, power, pulse width, acquiring data values for the data table stored in the memory 1410A, verifying operation, and other functions are stored in memory 1410C.

A number of program modules (or data) may be stored in the storage devices 1430 including an operating system, one or more application programs, other program modules, and program data. A user may enter commands and information into the computing device 1400 through one or more input devices 1440 such as a keyboard and a pointing device such as a mouse. Other input devices may include a digital camera, microphone, joystick, game pad, satellite dish, scanner, or the like. These and other input devices are often connected to the one or more processing units 1402 through a serial port interface that is coupled to the system bus 1406, but may be connected by other interfaces such as a parallel port, game port, or universal serial bus (USB). A monitor 1446 or other type of display device is also connected to the system bus 1406 via an interface, such as a video adapter. Some or all data and instructions can be communicated with a remote computer 1460 if desired.

Figure 15:
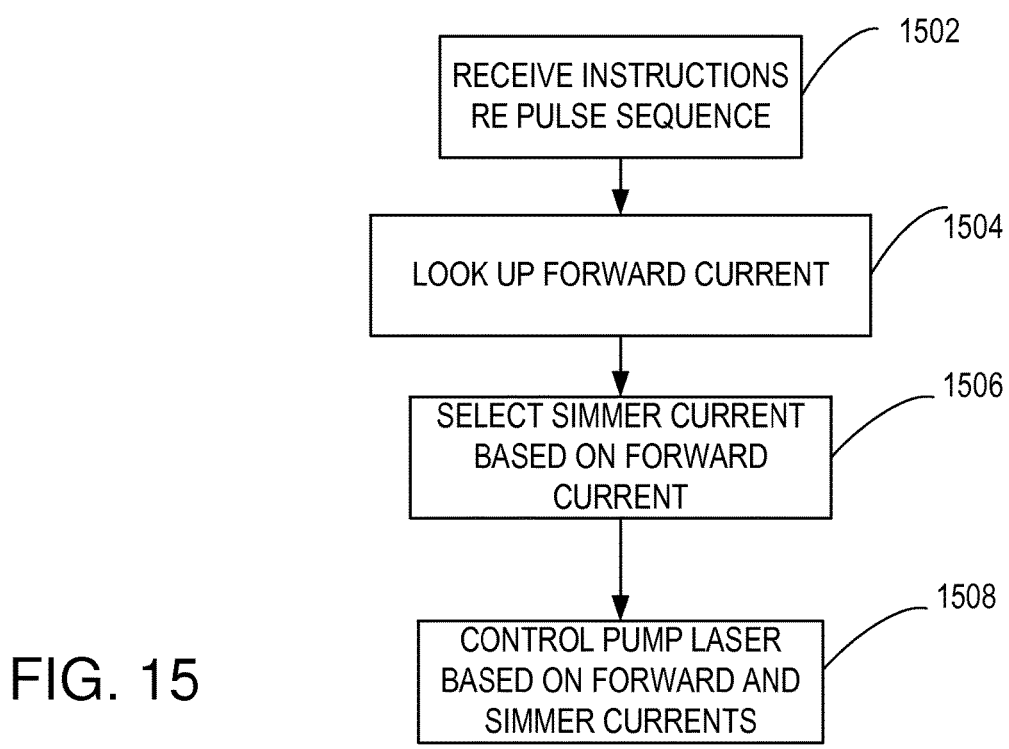
FIG. 15 illustrates a representative method of selecting forward and simmer currents.

Referring to FIG. 15, a method of selecting forward and simmer currents includes obtaining values associated with a laser pulse sequence at 1502. At 1504, a suitable forward current for a pump laser driver is selected based on the obtained values. At 1506, a simmer current is selected based on the forward current. The laser system is operated using the selected forward and simmer currents at 1508.

In view of the many possible embodiments to which the principles of the disclosed technology may be applied, it should be recognized that the illustrated embodiments are only preferred examples and should not be taken as limiting. We claim as our invention all that comes within the scope and spirit of the appended claims.

We claim:

1. A laser system, comprising:
   a seed laser;
   a doped fiber situated to receive optical pulses from the seed laser;
   a pump laser coupled to the doped fiber and configured to deliver pump optical radiation to the doped fiber to produce optical gain; and
   a pulse controller coupled to the seed laser and configured to signal initiation of a series of seed pulses, and coupled to the pump laser and configured to switch a pump laser drive current from a simmer current to a forward current upon initiation of the optical pulses from the seed laser, wherein the simmer current is selected to produce a gain for a first seed laser pulse in the series of seed pulses that corresponds to a saturated gain associated with exposure to the series of seed pulses produced with a forward current.

2. The laser system of claim 1, further comprising:
   a memory that stores simmer current values; and
   programmable logic configured to obtain a simmer current value based on the stored simmer current values.

3. The laser system of claim 2, wherein the programmable logic is configured to obtain the simmer current value based on interpolation using two or more simmer current values stored in the memory.

4. The laser system of claim 3, wherein the programmable logic obtains the simmer current values based on at least one of a pulse repetition frequency, a pulse power, pulse duration, a pulse energy, and an average power.

5. The laser system of claim 1, wherein the simmer current is selected so that a first pulse in a pulse sequence has a pulse power that is within ±10% of a steady state pulse power produced with a selected forward current.

6. The laser system of claim 1, wherein the doped fiber includes an active fiber that is an erbium, ytterbium, neodymium, dysprosium, praseodymium, or thulium-doped single mode optical fiber.

7. The laser system of claim 1, wherein the pulse controller is coupled to the seed laser to signal cessation of seed pulse generation, and to the pump laser so as to switch a pump laser drive current from the forward current to the simmer current in association with cessation of the optical pulses from the seed laser.

8. The laser system of claim 1, further comprising a digital to analog convertor that receives a digital value associated with the forward current or the simmer current, and an analog mux, coupled to the pulse controller that selects the forward current or the simmer current.

9. The laser system of claim 1, further comprising:
   a memory that stores simmer current values; and
   programmable logic configured to obtain a simmer current value based on two or more simmer current and average power pairs stored in the memory.

10. The laser system of claim 1, further comprising:
    a memory that stores simmer current values; and
    a processor configured to obtain a simmer current value based on the stored simmer current values.

11. A laser processing system, comprising:
    a workpiece stage; and
    a laser system as disclosed in claim 1, wherein the laser system is situated to direct a laser beam comprising a series of amplified pulses based on the series of seed pulses to a substrate situated at the workpiece stage.

12. A laser system, comprising:
    a pump laser driver coupled to switchably provide a forward drive current and a simmer drive current; and
    a laser system controller that initiates a seed laser pulse sequence and communicates switching from the simmer drive current to the forward drive current in the pump laser driver.

13. The laser system of claim 12, wherein the laser system controller is coupled to a memory and establishes the simmer drive current based on a simmer current database.

14. The laser system of claim 13, wherein the simmer and forward drive currents are selected so that a first pulse in an initiated pulse sequence has pulse power that is within at least ±10%, least ±5%, or least ±1% of a steady state pulse power.

15. The laser system of claim 14, further comprising a digital to analog convertor that receives a digital value associated with the simmer drive current, and converts the digital value into an analog value so that the simmer drive current is provided by the pump laser driver.

16. The laser system of claim 15, wherein the laser system controller determines a selected simmer current by retrieving two or more simmer current values and interpolating based on the retrieved values.

17. The laser system of claim 16, wherein the selected simmer current is determined based on two or more simmer current/average power pairs, and interpolating based on the retrieved values and the desired steady state average power.

18. A method, comprising:
applying a simmer drive current to a pump laser current of a fiber amplifier with a pump laser driver, the pump laser driver coupled to switchably provide a forward drive current and the simmer drive current; initiating a series of seed pulses of a seed laser pulse sequence with a laser system controller and directing the series of seed pulses to the fiber amplifier; and with the laser system controller, communicatively switching the pump laser current of the fiber amplifier from the simmer drive current to the forward drive current in association with initiating the series of seed pulses.

19. The method of claim 18, wherein the pump laser current is switched prior to initiating the series of seed pulses.

20. The method of claim 18, wherein the pump laser current is switched after initiating the series of seed pulses.

21. The method of claim 18, further comprising determining the simmer drive current based on stored simmer current values.

22. The method of claim 18, further comprising determining simmer current values based on interpolation among stored simmer current values.

23. The method of claim 18, wherein the applied simmer drive current is selected based on a desired average or pulse output power.

24. The method of claim 18, wherein the applied simmer drive current is selected based on a desired forward current.

25. The method of claim 18, further comprising directing an amplified series of seed pulses associated with the simmer drive current and the forward drive current to a workpiece.

26. The method of claim 18, wherein the fiber amplifier includes an active single mode optical fiber that is doped with erbium, ytterbium, neodymium, dysprosium, praseodymium, or thulium.

27. The method of claim 18, wherein the simmer and forward drive currents are selected so that a first pulse in the series of seed pulses has pulse power that is within at least ±10%, least ±5%, or least ±1% of a steady state pulse power.

* * * * *